W. M. REYNOLDS.
CULTIVATOR.
APPLICATION FILED MAY 20, 1918. RENEWED FEB. 13, 1919.
1,316,325.
Patented Sept. 16, 1919.
2 SHEETS—SHEET 1.
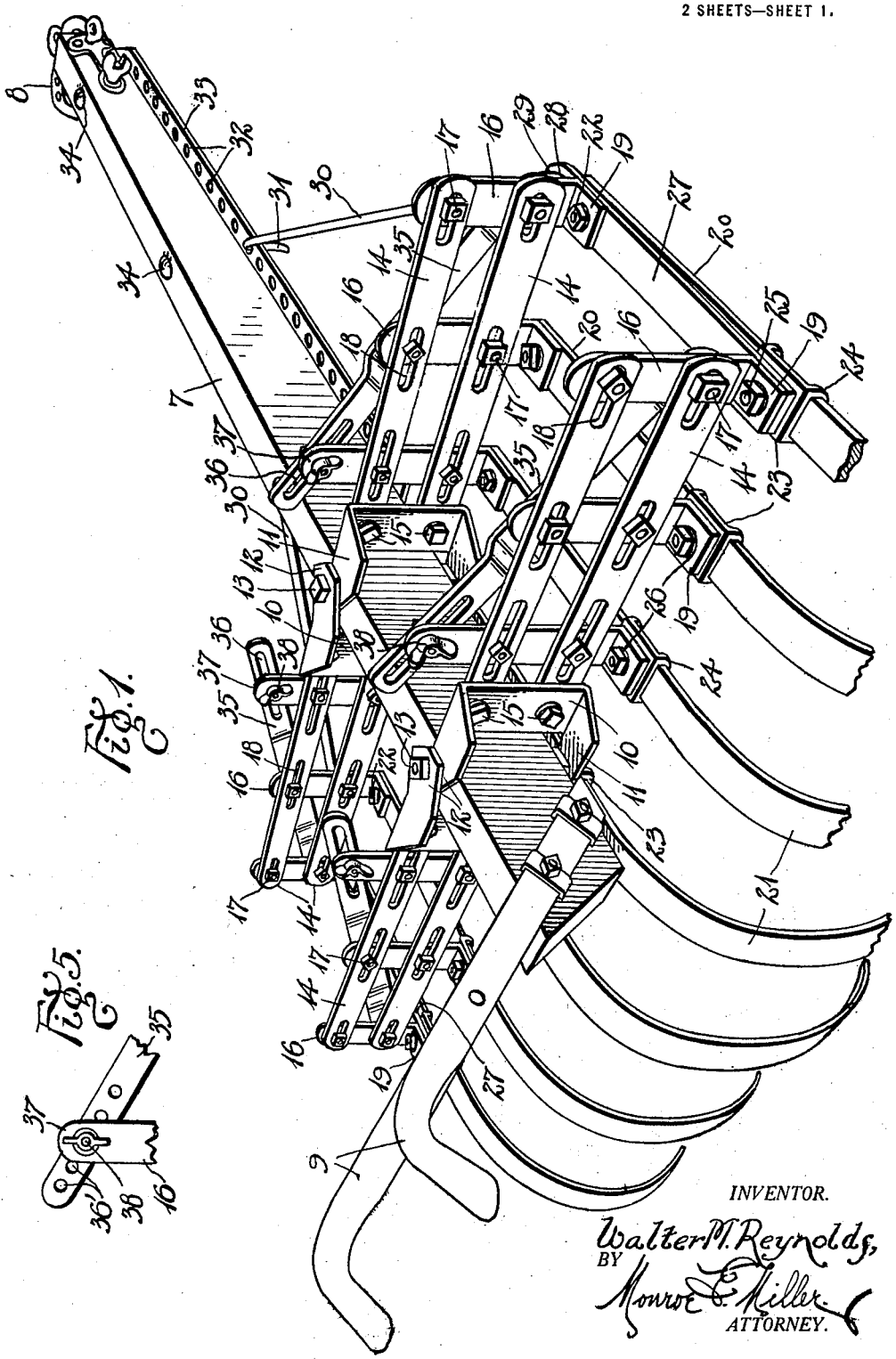
INVENTOR.
Walter M. Reynolds,
BY
Monroe E. Miller
ATTORNEY.

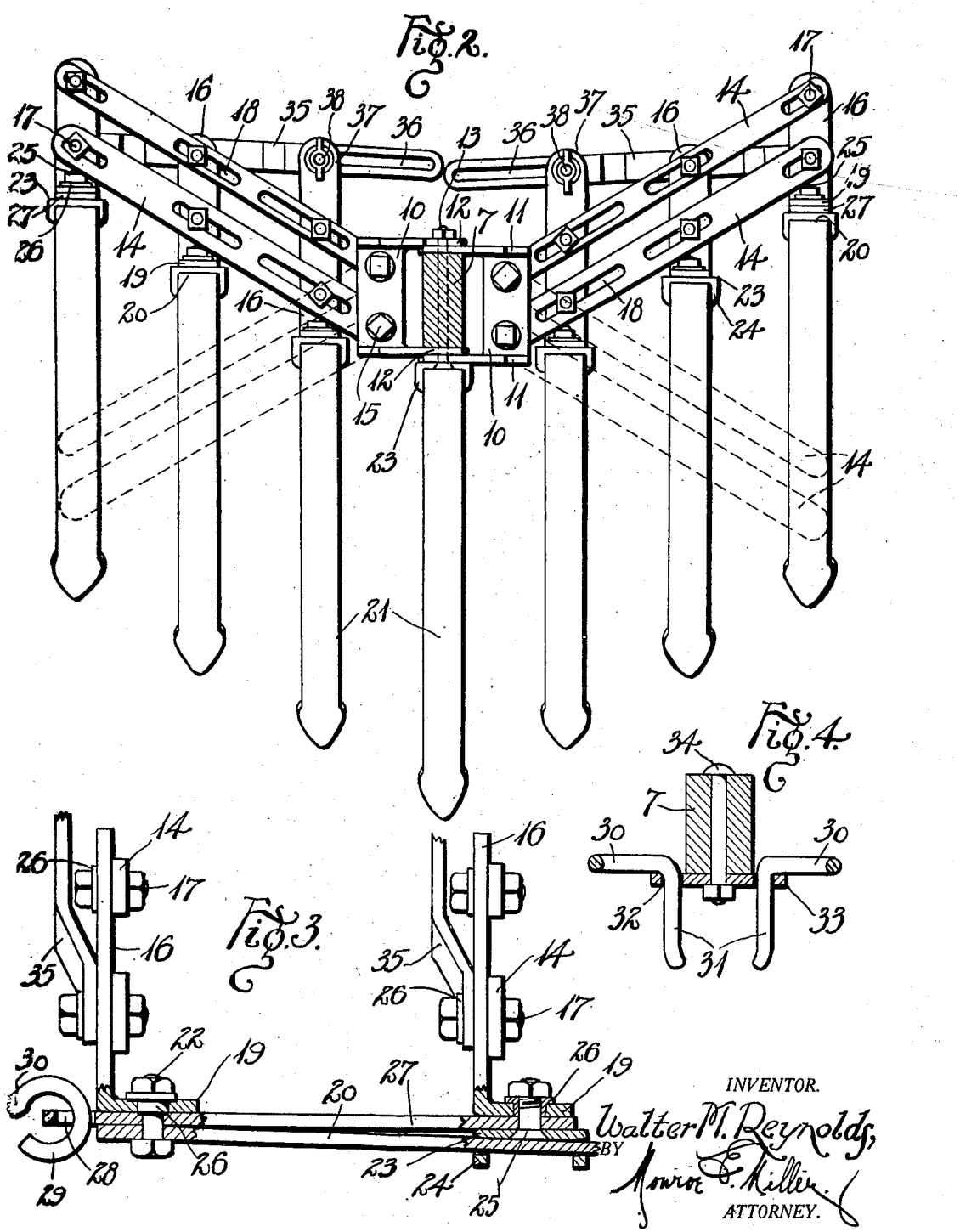

UNITED STATES PATENT OFFICE.

WALTER M. REYNOLDS, OF HATTIESBURG, MISSISSIPPI.

CULTIVATOR.

1,316,325.     Specification of Letters Patent.     Patented Sept. 16, 1919.

Application filed May 20, 1918, Serial No. 235,612. Renewed February 13, 1919. Serial No. 276,882.

*To all whom it may concern:*

Be it known that I, WALTER M. REYNOLDS, a citizen of the United States, and resident of Hattiesburg, in the county of Forrest and State of Mississippi, have invented certain new and useful Improvements in Cultivators, of which the following is a specification.

The present invention relates to cultivators, and aims to provide a soil working implement of that character in which the teeth are mounted in a novel manner for vertical, longitudinal and transverse adjustments to suit the various conditions of the soil and to enable the soil to be cultivated with equal efficacy on ridges and in furrows as well as on the level.

Another object of the invention is the provision of a cultivator having sets of teeth at opposite sides of a beam and connected thereto by parallelogram adjustments, so as to be raised and lowered and to be set forward and rearward according to the lay of the land and conditions of the soil, the teeth remaining in longitudinal vertical planes in all adjustments and being adjustable relatively to change the spaces therebetween and permit different numbers of the teeth to be used.

A further object is to provide such a cultivator with improved features of construction to enhance its utility and efficiency, in order that it will be satisfactory and practical in use for the many duties that it may be called upon to perform.

With the foregoing and other objects in view, which will be apparent as the invention is better understood, the invention resides in the combination and arrangement of parts as hereinafter described and claimed, it being understood that changes can be made within the scope of what is claimed without departing from the spirit of the invention.

The invention is illustrated in the accompanying drawings, wherein—

Figure 1 is a perspective view of the improved cultivator, some of the teeth being broken off.

Fig. 2 is a rear view, with the beam shown in cross section.

Fig. 3 is an enlarged side elevation of the outer end of the mounting for one set of teeth, portions being broken away and shown in section.

Fig. 4 is a cross section of the beam and the brace or stay engaging plate showing the braces or stays engaging said plate.

Fig. 5 is a detailed view showing a modification.

The cultivator embodies a beam 7 of any suitable sort having a clevis 8 or other attaching means at its forward end for hitching the draft animal thereto, and suitable handles 9 are fastened to the rear end of the beam so that the operator can conveniently guide the cultivator.

The adjustable mountings include longitudinal spaced pairs of vertical wings or plates 10 pivotally connected with the beam, the wings of each pair being at opposite sides of the beam and being swingable forwardly and rearwardly about vertical axes to permit of the longitudinal adjustment of the teeth. The wings 10 are formed from sheet metal of suitable gage, and the wings are all duplicates so as to minimize the cost of manufacture, each wing being formed at its upper and lower ends with flanges 11 bent at right angles to one side and extended beyond the inner edge of the the wing to form tongues 12 overlapping the upper and lower edges of the beam. As shown, the flanges 11 are turned rearwardly and the tongues 12 extend forwardly at an obtuse angle to pivotally engage the upper and lower terminals of vertical bolts 13, extending through the beam 7 to form pivots for the wings, with said bolts at the intersections of the vertical planes of the wings 10. The tongues 12 of each pair of wings are superposed and overlap above and below the beam, so that they engage the same pivot bolt, and although one wing is in this way at a slightly lower level than its companion, this difference is negligible as far as the position of the teeth is concerned.

A pair of parallelogram arms 14 is carried by each wing 10, so that said arms project in pairs to opposite sides from the beam, and the inner ends of said arms overlap the wings 10 and are pivoted thereto at vertically spaced points by means of pivot bolts 15, whereby said arms are swingable upwardly and downwardly on the horizontal axes of the bolts 15, and are swingable forwardly and rearwardly with the wings 10 on the vertical axes of the bolts 13. To each pair of arms 14 there is pivoted at spaced points different distances from the beam, standards 16 crossing and overlapping said arms and pivoted thereto by means of bolts 17. Each pair of arms and its standards 16 form a parallelogram which maintains the standards 16 vertical in all positions of the arms 14 when raised and lowered on the pivots 15. The standards 16 are adjustable along the arms 14 to various spaced positions, and for this purpose the arms 14 have slots 18 for the reception of the bolts 17, so that when the bolts are loosened they are slidable in said slots. Instead of using the slots, a series of apertures for the bolts 17 can be provided, similar to the apertures shown in Fig. 5, and if the adjustments of the standards 16 is not wanted, then the bolts 17 will only need individual apertures in the arms 14. The lower ends of the standards 16 are provided with feet 19 extending angularly to the rear for the attachment of the teeth 21 which have the forwardly projecting horizontal shanks or bars 20 underneath the arms 14. The cultivator teeth 21 are curved downwardly at the rear ends of the bars 20, and said teeth are resilient. The forward ends of the bars 20 extend under the feet 19 of the forward standards 16 and are pivoted thereto by means of bolts 22, and said bars have a pivotal and sliding connection with the rear standards 16. Thus, carriers or suspension plates 23 are disposed under the feet 19 of the rear standards and their forward and rearward ends have downturned lips or flanges 24 slotted for the sliding reception of the bars 20. The carriers 23 are pivoted to the feet 19 by means of bolts 25 having lower countersunk heads seated in the carriers so as to be out of the way of the bars 20, and washer bushings 26 are disposed on the bolts 25 and also on the bolts 22 within the feet 19 and underneath the nuts on the upper ends of said bolts, whereby when the bolts are tightened, the bushings 26 will be clamped leaving the feet 19 loose so that the parts are pivoted for free swinging movement about the vertical axes of the pivot bolts 22 and 25. The bushings 26 are also preferably used on the pivot bolts 17 and others where the bolts are to be tightened and still permit free pivotal movement.

The two pairs of arms 14 at each side of the beam are connected to provide a parallelogram comprising the two parallelograms defined by the arms 14 and their standards 16. For this purpose, a spacing bar or link 27 is disposed above the outermost bar 20 of each set of arms 14, and the rear ends of the bars 27 fit between the respective carriers 23 and feet 19 and pivotally engage the respective bolts 25, while the forward portions of the bars 27 pivotally engage the respective bolts 22 between the feet 19 of the forward outer standards 16 and the forward ends of the outer bars 20. These bars 27 thus serve as spacers and links connecting the outer free ends of the arms 14 to hold said arms parallel longitudinally of the cultivator, so that each set of arms will swing forwardly and rearwardly as a unit. The bars 27 thus connect the pairs of arms 14 at the opposite sides of the beam to provide compound parallelograms, whereby the standards 16 and teeth 21 are maintained vertical in all adjustments and the bars 20 are maintained longitudinal in all positions. In view of the fact that the bars 27 form the spacing connections between the pairs of arms 14, the bars 20 are relieved of this duty, and if the pivots 22 and 25 are not true with respect to the parallelogram motion, then the bars 20 can slide slightly in the carriers 23 as adjustments are made, and thus avoid the parts binding.

A central tooth 21 can also be employed below the beam 7, with its bar 20 connected at its forward end with the lower end of the forward bolt 13 and extending through a carrier 23 held by the lower end of the rear bolt 13. The central tooth 21 can be removed, as when the cultivator is used astride a row of plants, and such removal is easily accomplished by detaching the forward end of the bar 20 and withdrawing said bar from the carrier 23.

As shown, there are three teeth 21 in each of the sets at the opposite sides, although more or less can be used. The teeth can also be adjusted to space them as desired, and if fewer teeth are desired, the central tooth of each set can be removed and the inner tooth of the set adjusted outward nearer to the outer tooth.

The double parallelogram adjustment of each set of teeth enables the cultivator to be used under various conditions of the soil. When the cultivator is used on level soil, with the arms 14 horizontal, as seen in Fig. 1, the points of the teeth 21 will be in a horizontal plane. When the cultivator is used in furrows, the arms 14 are adjusted upward, as seen in full lines in Fig. 2, so that the teeth will work the soil properly in the furrow, whereas when the cultivator is used over a ridge, the arms 14 are adjusted downwardly, as seen in dotted lines in Fig. 2, in order that the teeth will uniformly engage the soil. These adjustments can be made at any position of the arms 14 longitudinally, and at any vertical position of said arms, they can be swung forwardly and rearwardly for longitudinal adjustment, it being apparent that as the arms 14 are swung toward and away from the beam 7, the teeth 21 are moved closer together and further apart, respectively. Furthermore, when the arms are at right angles with the beam, the teeth 21 will be in transverse alinement, and when the arms 14 are swung forwardly and rearwardly, the teeth will extend diagonally forward or rearward, respectively, whichever is desired.

Means are provided for holding the parallelograms and their teeth in their various adjustments. Thus, in order to hold the arms 14 in their longitudinal adjustments, the bars 27 have their forward ends projected beyond the forward arms 14 and their standards 16 and provided with openings 28 for the engagement of the loops or hooks 29 at the rear ends of forwardly converging stay or brace rods 30. The forward ends of these rods have downturned hooks 31 insertible through longitudinal rows of apertures 32 in the opposite edge portions of a longitudinal plate 33 secured to the lower edge of the beam 7 by bolts 34 or other fasteners. The plate 33 is located between the forward arms 14 and forward end of the beam, with the edge portions of said plate projecting from underneath the beam, so that the hooks when moved along the sides of the beam during adjustment, can be readily dropped through apertures when forward or rearward adjustment has been completed. The rods 30 will then prevent accidental forward and rearward adjustment, and will transmit the strains from the outer ends of the arms 14 and bars 27 to the beam.

The vertical adjustment of the arms 14 and teeth 21 is maintained by means of braces 35, one for each pair of arms 14. The lower outer ends of the braces 35 pivotally engage the lower outer bolts 17, and said braces extend upwardly and inwardly, and are provided at their inner ends with slots 36, while the inner standards 16 have their upper ends extended, as at 37, and provided with bolts 38 passing through the slots 36. The bolts 38 have thumb nuts so that they can be conveniently loosened and tightened for making adjustments, and when the bolts are loosened, the braces 35 can slide thereon, permitting the arms 14 to be raised and lowered. Instead of using the slots 36, series of apertures 36′, as seen in Fig. 5, can be used, but the slots are preferable because they do not require the removal of the bolts 38 as do the apertures.

From the foregoing, taken in connection with the drawings, it is believed that the advantages and utility of the improved cultivator will be readily appreciated by those familiar in the art, without further description being necessary.

Having thus described the invention, what is claimed as new is:

1. A cultivator embodying a beam, a pair of vertical wings at opposite sides of said beam having flanges extending at an angle from their upper and lower ends between the edges of said wings to stiffen them, said flanges having extensions projecting beyond the inner edges of said wings and overlapping one another above and below the beam, means pivoting said extensions to the beams, and tooth supporting means overlapping and pivoted to said wings.

2. A cultivator embodying a beam, a pair of arms pivotally connected therewith, standards pivotally connected with the arms to form a parallelogram and carry the teeth, and a brace pivotally connected to one movable part of said parallelogram and having an adjustable connection with another movable part, one of said parts having an extension for the connection of the brace.

3. A cultivator embodying a beam, a pair of arms pivotally connected therewith, standards pivoted to the arms for parallelogram movement, one standard having an extension, and a brace connected to a pivot of another standard and having an adjustable connection with said extension.

4. A cultivator embodying a beam, a wing pivoted thereto, arms pivoted to the wing, tooth carrying standards, pivots connecting said standards and arms, said arms having means for the adjustment of said standards toward and away from said beam, and means for holding said arms when swung to different positions.

5. A cultivator embodying a beam, wings pivoted thereto at opposite sides, pairs of arms pivoted to the wings, standards, pivots connecting said standards and arms, said arms having means for the adjustment of said pivots toward and away from the beam, and bars pivotally connected with said standards and having teeth.

6. A cultivator having parallelogram arms, standards carried thereby, teeth bars pivotally connected with some of said standards, and means for connecting said bars with the other standards for pivotal and sliding movements.

7. A cultivator having parallelogram arms, standards carried thereby, carriers pivoted to certain standards, and teeth bars pivoted to the other standards and extending slidably through said carriers.

8. A cultivator having parallelogram arms, standards carried thereby, carriers pivoted to certain standards, teeth bars pivoted to the other standards and extending slidably through the carriers, a spacing bar connecting said arms, and means for holding said arms when swung to different positions.

9. A cultivator having parallelogram arms, a beam supporting them, standards carried by said arms, teeth bars supported by said standards for parallelogram adjustment, a spacing bar connecting said arms, and a brace adjustably connecting said spacing bar and beam.

10. A cultivator embodying a beam, wings pivoted to the beam, arms pivoted to said wings, standards pivoted to said arms, teeth bars having pivotal connections with some of the standards and both pivotal and slidable connections with the others, a spacing bar connecting two standards to space the arms, means for holding the arms of each wing when swung to different positions, and a brace adjustably connecting said beam and spacing bar.

In testimony whereof, I hereunto set my hand this 9th day of May, 1918.

WALTER M. REYNOLDS.

Copies of this patent may be obtained for five cents each, by addressing the "Commissioner of Patents, Washington, D. C."